United States Patent
Lee et al.

(10) Patent No.: US 8,628,008 B1
(45) Date of Patent: Jan. 14, 2014

(54) SYSTEM AND METHOD FOR CARD CUSTOMIZATION

(75) Inventors: Jesse Fung Lee, Dublin, CA (US);
Maher Salfiti, Concord, CA (US);
Karen Keldgord Lanfranki, Walnut Creek, CA (US); Jennifer Borchardt, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 608 days.

(21) Appl. No.: 12/288,110

(22) Filed: Oct. 16, 2008

(51) Int. Cl.
*G06K 7/00* (2006.01)

(52) U.S. Cl.
USPC ............................ 235/380; 235/375; 235/379

(58) Field of Classification Search
USPC .................. 235/375, 379, 380; 705/5, 35–45
See application file for complete search history.

(56) References Cited

U.S. PATENT DOCUMENTS

| | | | |
|---|---|---|---|
| 6,877,656 B1 | 4/2005 | Jaros et al. | |
| 7,131,583 B2 | 11/2006 | Jaros et al. | |
| 7,302,719 B2 | 12/2007 | Jaros et al. | |
| 2003/0182230 A1* | 9/2003 | Pessin | 705/39 |
| 2004/0160624 A1 | 8/2004 | Edgar et al. | |
| 2005/0097008 A1* | 5/2005 | Ehring et al. | 705/26 |
| 2005/0167487 A1* | 8/2005 | Conlon et al. | 235/380 |
| 2007/0185795 A1* | 8/2007 | Petrime et al. | 705/35 |
| 2007/0246526 A1 | 10/2007 | Edgar et al. | |
| 2008/0037900 A1 | 2/2008 | Edgar et al. | |

OTHER PUBLICATIONS

Capital One, Design your card, Our photos, Retrieved on Feb. 10, 2009: https://www.capitaloneimagecard.com/allaaboutme/desioner/capitaloneus/uscard/designer.aspx, Believed to have been available prior to Oct. 16, 2008.
Capital One, Preview your card, Retrieved on Feb. 10, 2009: https://www.capitaloneimagecard.com/allaaboutme/desicrier/capitaloneus/uscard/desioner.aspx, Believed to have been available prior to Oct. 16, 2008.
Capital One, Design your card, Upload your photos, Retrieved on Feb. 10, 2009: https://www.capitaloneimagecard.com/allaaboutme/designer/capitaloneus/uscard/desioner.aspx, Believed to have been available prior to Oct. 16, 2008.

* cited by examiner

*Primary Examiner* — Michael G Lee
*Assistant Examiner* — Matthew Mikels
(74) *Attorney, Agent, or Firm* — Foley & Lardner LLP

(57) ABSTRACT

A computer-implemented data processing system comprises eligibility logic and network interface logic. The eligibility logic is configured to generate a list of accounts that are eligible for customized cards (e.g., credit cards, debit cards) and that are associated with a user. The network interface logic is configured to generate a user interface for interaction with the user. The user interface includes screen displays configured to display the list of accounts and configured to receive card customization information from the user. The card customization information includes information regarding a custom image to be placed on a customized card.

25 Claims, 16 Drawing Sheets

| Customer Experience (CX) | Creator: Evany Thomas | Version: REV1 | Date: 04/23/2008 |
|---|---|---|---|
| Project: Custom Photo Card – WIB | | | |
| Page: Photo Eligibility – Verify Delete Customization | | | |

1300

Verify Remove Customization  ? Help

Please confirm your request to remove the customization from the following card:

Pat Smith, ATM & Check Card XXXX-XXXX-XXXX-1278  — 1310

If this information is correct, please click Submit.

[ Cancel ]  [ Submit ]

Fig. 13A

| Photo Card | | | ? Help | I Want To… |
|---|---|---|---|---|
| We have received your request to remove your customization for the ATM & Check Card XXXX-XXXX-XXXX-1278 for Pat Smith. Your updated card will arrive within 5 to 7 business days.<br><br>The Photo Card is a free feature that lets you customize your Personal and Business credit and debit cards.<br><br>To customize a new card or update/remove the customization from a current card, simply make sure you have your favorite digital image or company logo ready to upload, then get started below. | | | | Read Photo Card FAQs<br>Pay a bill with Bill Pay<br>Transfer funds between accounts<br>View online statements<br>Change my address<br>Nickname accounts<br>View tax documents<br>Learn about new features<br>View more services |
| Account Holder | Account | Photo Card Status | Next Steps | |
| SMITH ENTERPRISES | | | | |
| PAT SMITH | VISA PLATINUM CARD XXXX-XXXX-XXXX-XXXX-2341 | Eligible | Customize Now | |
| PAT SMITH | VISA PLATINUM CARD XXXX-XXXX-XXXX-XXXX-3345 | Eligible | Customize Now | |
| PAT SMITH | VISA PLATINUM CARD XXXX-XXXX-XXXX-XXXX-1255 | Processing | | |
| PAT SMITH | ATM & Check Card XXXX-XXXX-XXXX-1278 | Processing | | |
| COMPANY, INC. | | | | |
| KELLY THOMAS | VISA SIGNATURE CARD XXXX-XXXX-XXXX-XXXX-3456 | Eligible | Customize Now | |
| PAT SMITH | VISA SIGNATURE CARD XXXX-XXXX-XXXX-XXXX-3345 | Eligible | Customize Now | |
| KELLY THOMAS | ATM & Check Card XXXX-XXXX-XXXX-1278 | Processing | | |
| KELLY THOMAS | VISA PLATINUM CARD XXXX-XXXX-XXXX-XXXX-1255 | Customized | Update \| Remove | |
| PERSONAL ACCOUNTS | | | | |
| PAT SMITH | VISA PLATINUM CARD XXXX-XXXX-XXXX-XXXX-2341 | Eligible | Customize Now | |
| PAT SMITH | VISA PLATINUM CARD XXXX-XXXX-XXXX-XXXX-3345 | Eligible | Customize Now | |
| PAT SMITH | VISA PLATINUM CARD XXXX-XXXX-XXXX-XXXX-9876 | Processing | | |
| PAT SMITH | ATM & Check Card XXXX-XXXX-XXXX-XXXX-6734 | Customized | Update \| Remove | |
| PAT SMITH | ATM & Check Card XXXX-XXXX-XXXX-XXXX-9987 | Customized | Update \| Remove | |

Fig. 13B

SYSTEM AND METHOD FOR CARD CUSTOMIZATION

FIELD

The present invention relates generally to the field of card customization. More particularly, the present invention relates to systems and methods for customizing cards to contain images provided by users of the cards.

BACKGROUND

Financial institutions often issue cards that provide access to accounts, such as credit cards and debit cards. Such cards are issued to both businesses and consumers. Oftentimes, it is desirable to permit the users to customize such cards to include custom images. For example, a business may wish to place its logo on credit cards issued to individual employees. Likewise, a consumer may wish to place a photo of family members or friends on the consumer's credit card or debit card. Enhanced systems and methods of customizing cards to contain images provided by users of the cards would be desirable.

SUMMARY

One embodiment of the invention relates to a computer-implemented method of customizing a card issued by a financial institution. The method comprises generating a screen display that is pre-populated with information regarding accounts associated with a user and that are eligible for a customized card. The method further comprises receiving card customization information based on user input. The card customization information includes information regarding a custom image to be placed on the customized card.

Another embodiment of the invention related to a computer-implemented data processing system comprising eligibility logic and network interface logic. The eligibility logic is configured to generate a list of accounts that are eligible for customized cards and that are associated with a user. The network interface logic is configured to generate a user interface for interaction with the user. The user interface includes screen displays configured to display the list of accounts and configured to receive card customization information from the user. The card customization information includes information regarding a custom image to be placed on a customized card.

BRIEF DESCRIPTION OF THE DRAWINGS

FIG. 3 is a screen shot showing a screen that may be provided to a user to prompt the user to select a design option, according to an example embodiment.

FIG. 8 is a screen shot showing a screen that may be provided to a user to add text when the user has selected an option to select a logo in the screen in FIG. 3.

FIG. 13A is a screen shot showing a screen that prompts the user to verify the removal of customization on a card.

FIG. 13B is a screen shot informing the user that a request to remove customization for a card was received and showing the updated status of the card from FIG. 13A.

DETAILED DESCRIPTION OF THE EXAMPLE EMBODIMENTS

Figure 1A:
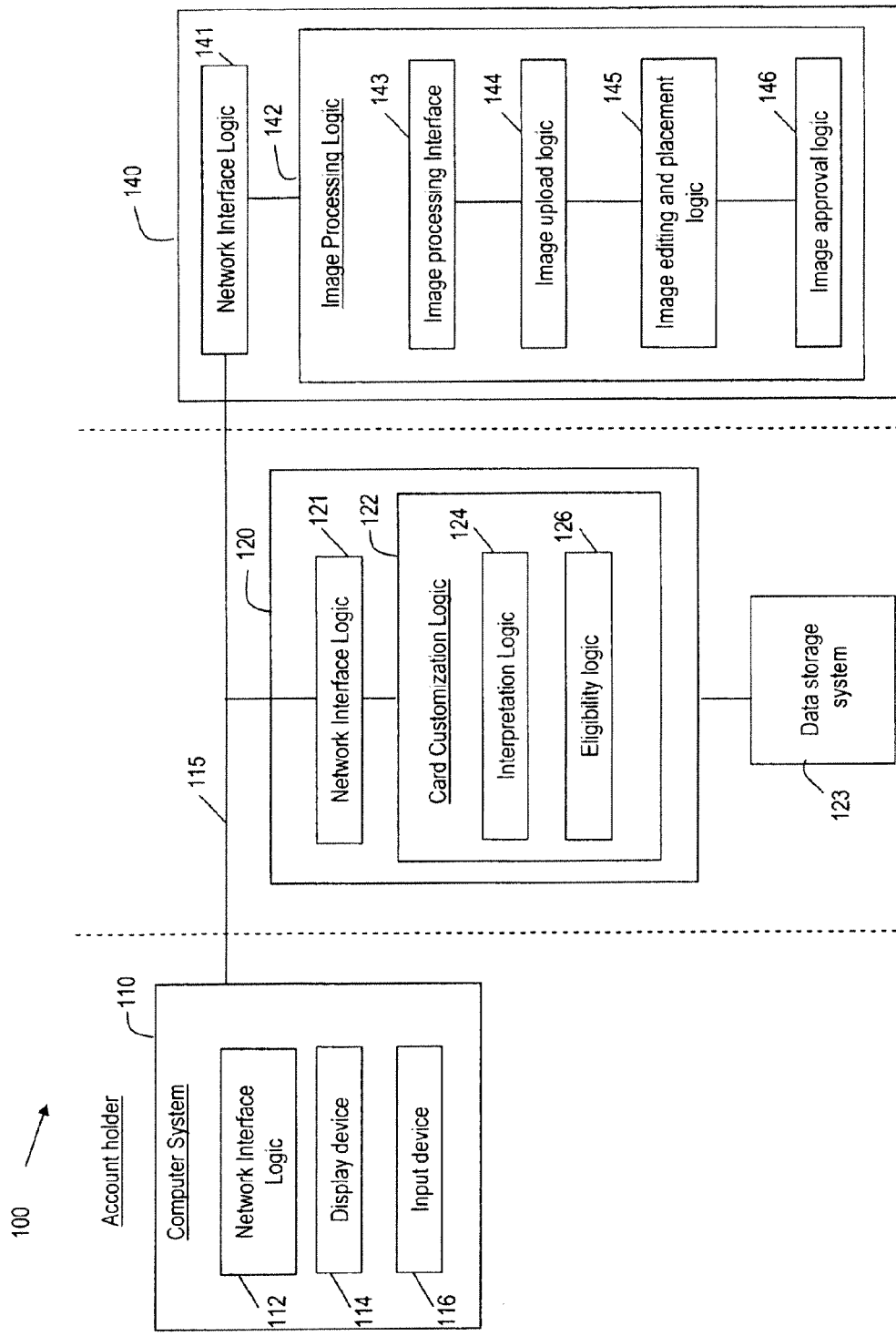
FIG. 1A is a schematic diagram of a computer-implemented data processing system according to an example embodiment.

Referring to FIG. 1A, a computer-implemented data processing system 100 is shown that may be used by a bank or other financial institution to receive card customization instructions from account holders. The account holders may be business entities and/or individual consumers that hold accounts with the financial institution. The cards may include business or consumer credit cards, debit cards, or check cards associated with such accounts, and/or other types of cards such as prepaid cards.

Figure 1B:
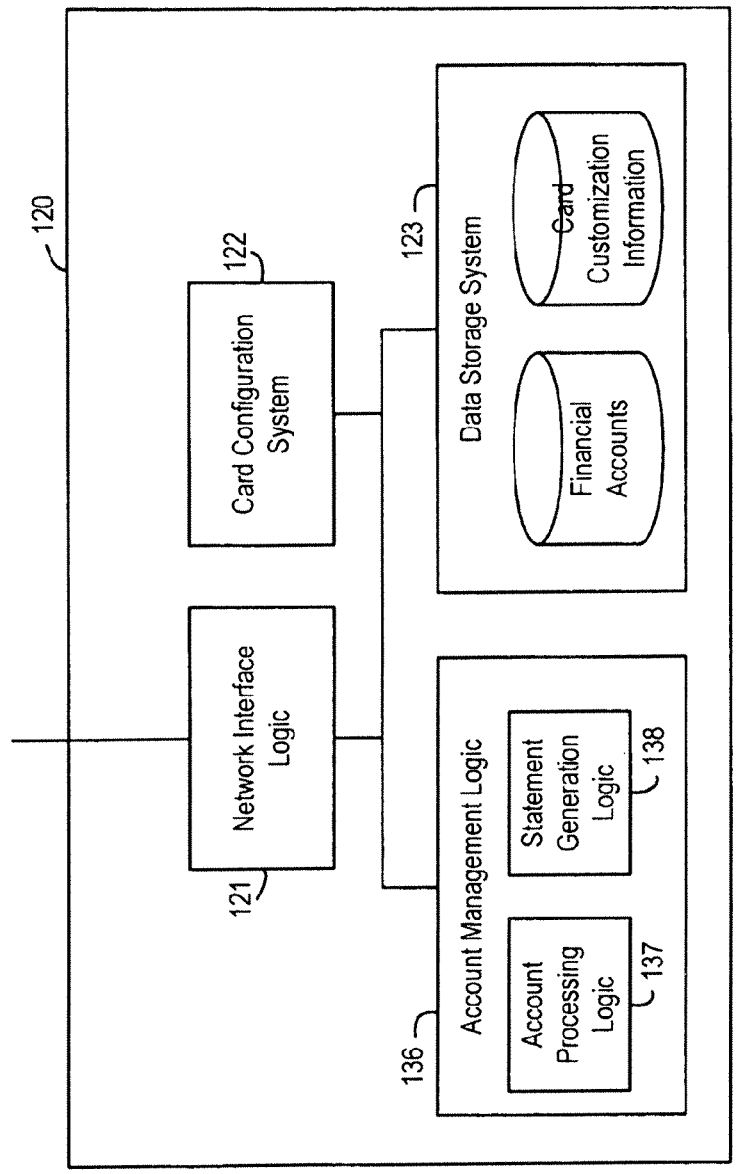
FIG. 1B is a schematic diagram showing a data processing system of FIG. 1A in greater detail according to an example embodiment.

System 100 may include, among other systems, a computer system 110, a data processing system 120 that includes card customization logic 122, and a data processing system 140 that includes image processing logic 142. The computer system 110, the data processing system 120, and the data processing system 140 may communicate through a network 115, such as the Internet. The data processing systems 120 and 140 may each comprise a computer system (e.g., one or more servers each with one or more processors) configured to execute instructions stored in memory to implement the operations described herein associated with logic shown in FIGS. 1A-1B. Although in the illustrated embodiment the data processing systems 120 and 140 are shown as being separate and as communicating through the Internet, it will be appreciated that the data processing systems 120 and 140 may also be integrated in a single data processing system.

The computer system 110 may be used by an individual user (e.g., a business owner or employee, a consumer, and so on) to provide card customization information, such as images, text, logos, instructions, and so on. The computer system 110 comprises a network interface logic 112, a display device 114 and an input device 116. Network interface logic 112 may include, for example, program logic that implements a web browser. For example, the computer system 110 may receive web pages or other screen displays which are then presented to the user via the display device 114. In an example embodiment, such web pages may be used to request a username and password associated with accounts held by the user at the financial institution. Such web pages may also be used to prompt the user to provide information regarding custom images to be placed on a card. Such information may include a logo, text, a selection of an image by the user from a library of images, an image uploaded by the user from the computer system 110, and so on. The input device 116 to may be used to facilitate receiving the requested information from the user.

The data processing system 120 includes, network interface logic 121, card customization logic 122 and data storage system 123. The data processing system 120 is associated with the financial institution. In an example embodiment, system 100 is provided by the financial institution, and the users are customers of the financial institution that access customization logic 122 through an on-line account area of a website of the financial institution. For example, system 120 may be provided by a bank, and the users may be customers of the bank that access customization logic 122 through an on-line banking area of a website of the bank. To this end, the data processing system may include account management logic 136 which may further include financial account processing logic 137 and statement generation logic 138. The account processing logic 137 performs account processing to process transactions in connection with the account(s) of the account holder, such as account debits and credits to checking and savings accounts, credits and debits to home mortgage and home equity accounts, credits and debits to student loan accounts, and so on. For example, in the context of checking accounts, the transactions may also include electronic bill payment transactions in which monies from the checking account of the user are used to pay bills received by the user. Statement generation logic 138 generates statements for the user relating to the user's account(s). The user may, for example, interact with such logic prior to or after interacting with the card customization logic 122.

Referring again to FIG. 1A, the network interface logic 121 may include a web server that generates web pages provided to the account holder through the internet. For example, web pages may be provided that make on-line banking tools available to the account holder, e.g., to provide the user with information regarding pending card/account transactions, account balances, and so on, for accounts held by the user at the financial institution, as indicated above. The network interface logic may also otherwise interface in other ways with the data processing system 120 with the computer system 110 and the data processing system 140 through the network 115.

The card customization logic 122 further includes interpretation logic 124 and eligibility logic 126. In one example embodiment, the network interface logic 121 is configured to cooperate with, among other systems, the interpretation logic 124 to generate a user interface through which the account holder may access the card customization logic 122. Thus, in addition to the on-line banking web pages discussed above, additional web pages may be provided that may be used for card customization. Examples of such web pages, which may be generated by the data processing system 120 and/or the data processing system 140, are described in greater detail below in connection with FIGS. 2-13.

The eligibility logic 126 may perform processing to determine a list of one or more accounts held by the account holder that are eligible for customized cards. The eligibility logic 124 may query the data storage system 123 for information regarding each of the cards for the account holder. Based on such information, eligibility logic 126 may apply eligibility rules to determine whether particular accounts are eligible for customized cards. The list of eligible accounts may be forwarded to the computer system 110 via the network interface logic 122. For example, as described below, web pages may be generated that list the accounts that have received customized cards and the accounts that are eligible to receive customized cards. The eligibility may be determined based on a variety of factors, such as the type of account held by the user, whether the account is about to expire, and so on.

After a user chooses which card to customize, the data processing system 140 provides a screen displays various customization options. The data processing system 140 includes network interface logic 141 (e.g., a web server) and image processing logic 142. The image processing logic 142 further comprises an image processing interface 143, image upload logic 144, image editing the placement logic 145, and image approval logic 146. The image processing interface 143 may display a variety of customization choices, such as but not limited to background customization, adding a logo or adding a photograph. The image upload logic 144 allows a user to upload an image for the card customization or use an image that is provided by a data source. In one example embodiment, the image editing and placement logic 145 may either move, resize, rotate or flip the image. The image editing and placement logic 145 may also provide the user with a warning if the image does not cover the card completely. The image editing and placement logic 145 may also allow the user to add text to the card. The image approval logic 146 permits a user to preview the card with the images and approve the card from the input device 116.

Figure 1C:
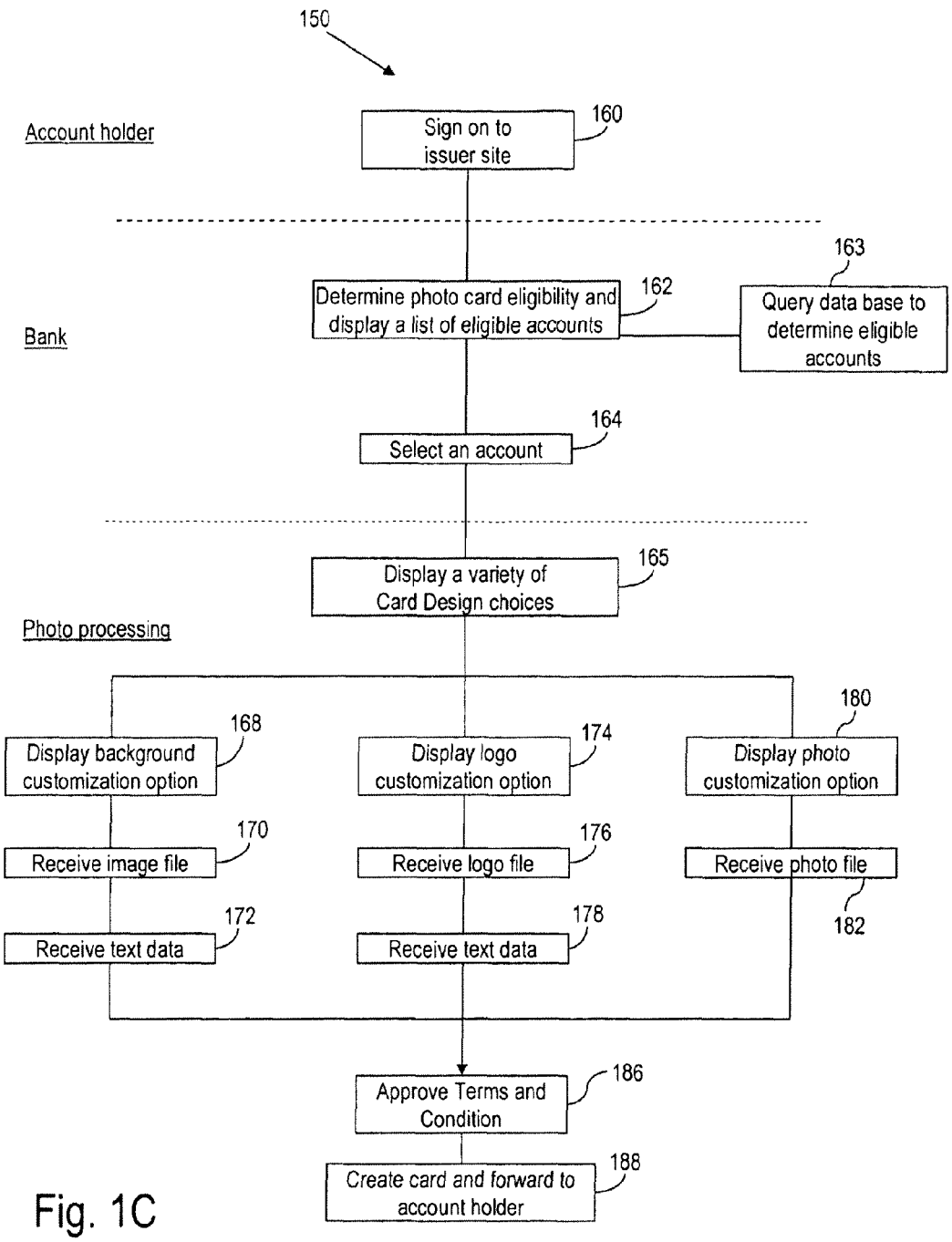
FIG. 1C is a process implemented by the data processing of FIG. 1A.

FIG. 1C shows an overview of process 150 that may be implemented by system 100. In process 150, system 100 is configured to be responsive to user inputs to customize a card issued by the financial institution. The process 150 is described in greater detail below in connection with FIGS. 2-13.

Referring first to FIG. 1C, at step 160, the user is prompted for user identifying information, such as for example, a username and password. (Herein, "username", "user ID", "login name", "login ID", and other terms for identifying a user are used interchangeably.) After being prompted to do so, the user provides user inputs (e.g., mouse movements, mouse clicks, keyboard taps, etc.) to provide such information. The user then enters an on-line account area of the financial institution, where the user is able to view account information such as account balances, transactions and so, and obtain access to other services offered by the financial institution to its customers. In the embodiment herein, one such service is the ability to receive customize cards in connection with one or more of the accounts held by the user at the financial institution. In response to selecting a link to take advantage of this service, at step 162, a screen display is generated that shows a pre-populated list of -populated eligible cards. In order to generate the screen display, database 123 is queried to determine eligible cards in step 163. In step 164, a user is allowed to select an eligible account from the list provided in step 162.

At an appropriate point, assuming image processing is performed at a separate system (in the illustrated embodiment, at data processing system 140), authentication information is passed from the data processing system 120 to the data processing system 140. This allows the user to be identified at the data processing system 140. At no point does the user have to enter any account information, all information regarding the accounts is retrieved from the data storage system 123 based on the username entered at step 160. Likewise, at no point does the user have to enter a social security number or any part thereof. In other embodiments, as indicated above, the data processing systems 120 and 140 is provided as a single integrated data processing system, which may avoid the need to pass the authentication information through the internet while still also avoiding the need for the user to enter account/social security number information.

Next, in step 165 a screen display is generated that shows a variety of image card design choices. The account holder then chooses one or more of the image design choices shown. In one example embodiment, the design choices may be include an option to customize the background (step 168), an option to add a logo (step 174), and option to add a photo (step 180). If the user selects to customize the background, then the user is prompted to either upload an image or use an image from the image library (step 170). After choosing an image, the user may be give choice to add text onto the card in step 172. If the user selects to add a logo, then in step 176 the user may upload an image of the logo and be given the option to input a tag line or text in step 178. If the user selects to add a photo, then the user is presented with the option to upload a photo 182 or use one from the library. The user is then given the option to preview the card in step 184. Next, if the user approves the card, the user is asked to approve the terms and conditions 186 of the card customization program. Lastly, in step 188, the financial institution manufactures the card and forwards it to the account holder for use.

Referring now to FIGS. 2-13, various screen displays are shown that may be generated during the process 150. In an example embodiment, as previously indicated, the card customization logic 122 provides an on-line tool that is accessible to users via the internet. In such an embodiment, the screens may be web pages displayed within a web browser, and the configuration information may be received from the user by way of the Internet.

Figure 2:
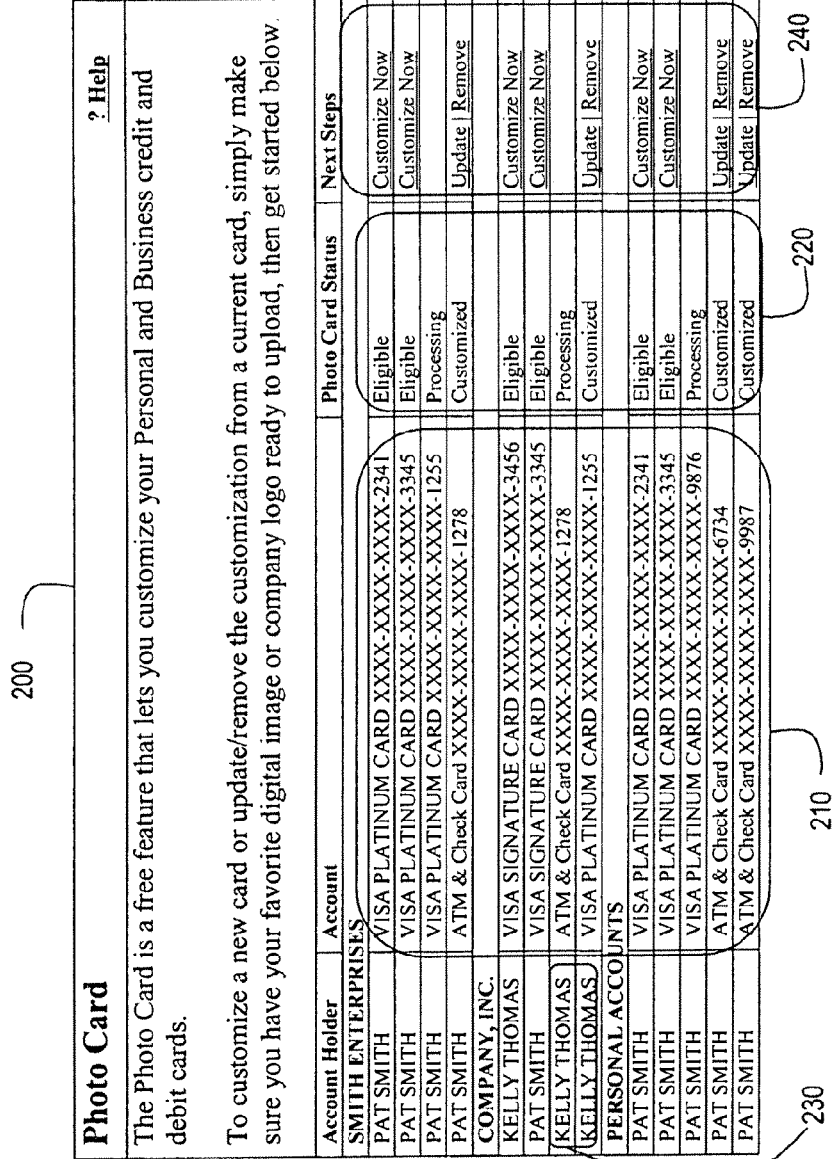
FIG. 2 is a screen shot showing a screen that may be provided to a user with a list of eligible cards from various accounts including business and personal accounts.

Referring now to FIG. 2, FIG. 2 shows an eligibility screen 200 that may be provided to the user. The eligibility screen 200 lists each of the accounts 210 of the user that are eligible for customized cards. As shown in this example embodiment, personal accounts and/or business accounts that are associated with a card issuer are all displayed on the screen 200. In the example shown, the customization logic 122 is being accessed by "Pat Smith" who may, for example, be a small business owner. Ms. Smith may have access rights to accounts that he holds both in a business and personal capacity, and accounts that are associated with other individuals (e.g., "Kelly Thomas" who may, for example, be an employee of one of the businesses owned by Ms. Smith). Thus, in the context of a business, different users may be associated with accounts in different ways, and different rights may be given to the users in connection with cards associated with the accounts. For example, one employee may be given the ability to conduct transactions with a given card. A second, different employee (e.g., an employee in an accounting department) may be given the ability to access the account for a given card and to configure a customized card, but not the right to make purchases with the card. Hence, such an employee may have access rights to the accounts for a number of other employees and may configure customized cards for the other employees (e.g., to give all of the employees customized cards containing the company logo).

Eligibility screen 200 displays the card status in field 220. The card status may, for example, indicate whether a card associated with an account has been customized or is eligible for or not eligible for customization. In field 240, options for next steps are shown. For example, the user can choose to customize a card, update an already customized card or remove the customization on a card. Screen shots that may be provided to the user in connection with such operations are shown in FIGS. 3-13B.

Figure 3:
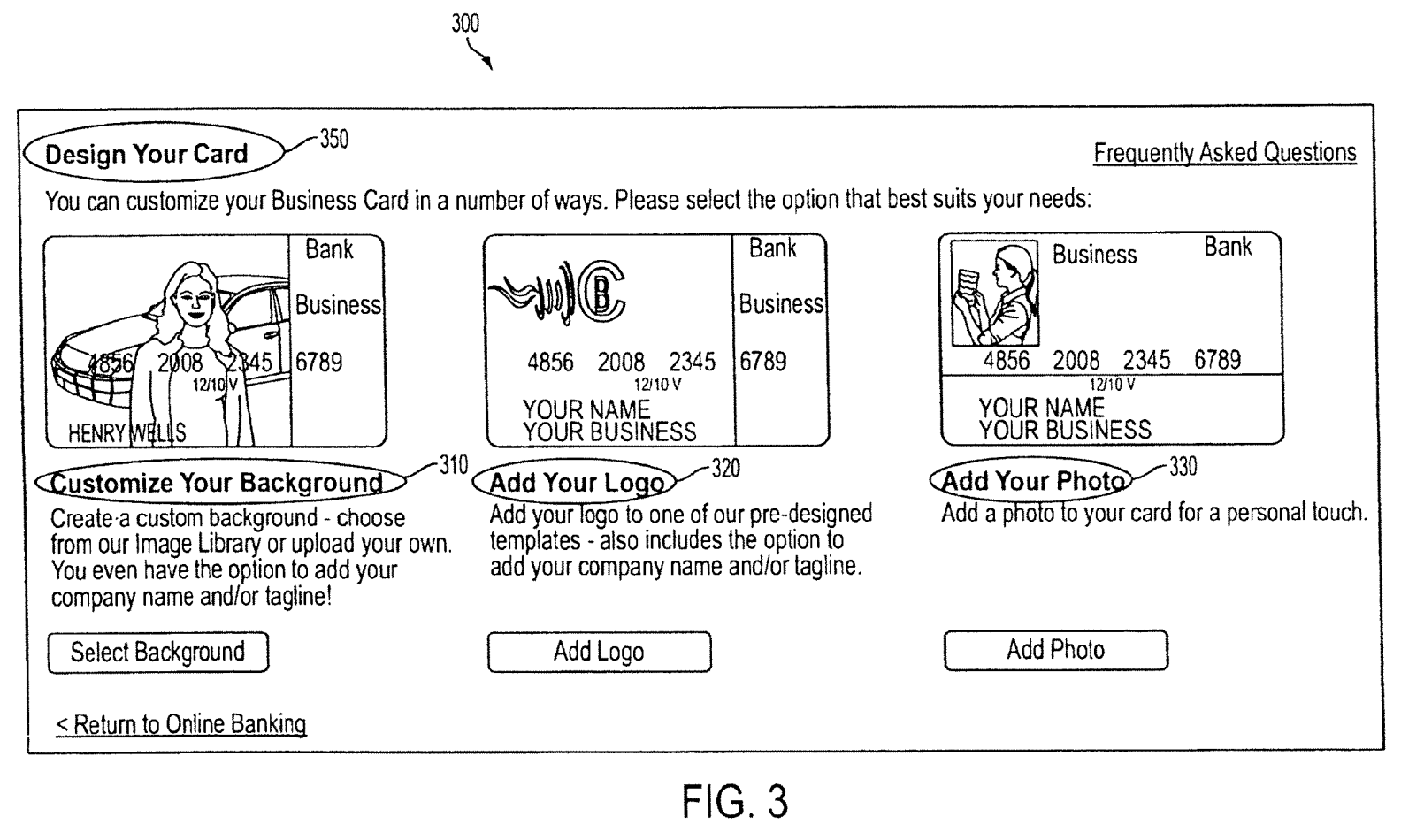

Referring now to FIG. 3, FIG. 3 shows a screen 300 that may be provided to the user to prompt the user to select how to customize a card. In FIG. 3, the user may select between options to add various types of images to the card, including an option to customize a background, an option to add a logo, and an option to select a photo. Each of the choices may be selected using respective links 310-330. Once the user selects one of the customization choices, the user is directed to screens such as shown in FIGS. 4-6 (where selection is for the image to be a background and text), FIGS. 7-10 (where the selection is for the image to be a logo and text), or FIGS. 11-12 (where the selection is for the image to be a photo).

Figure 4:
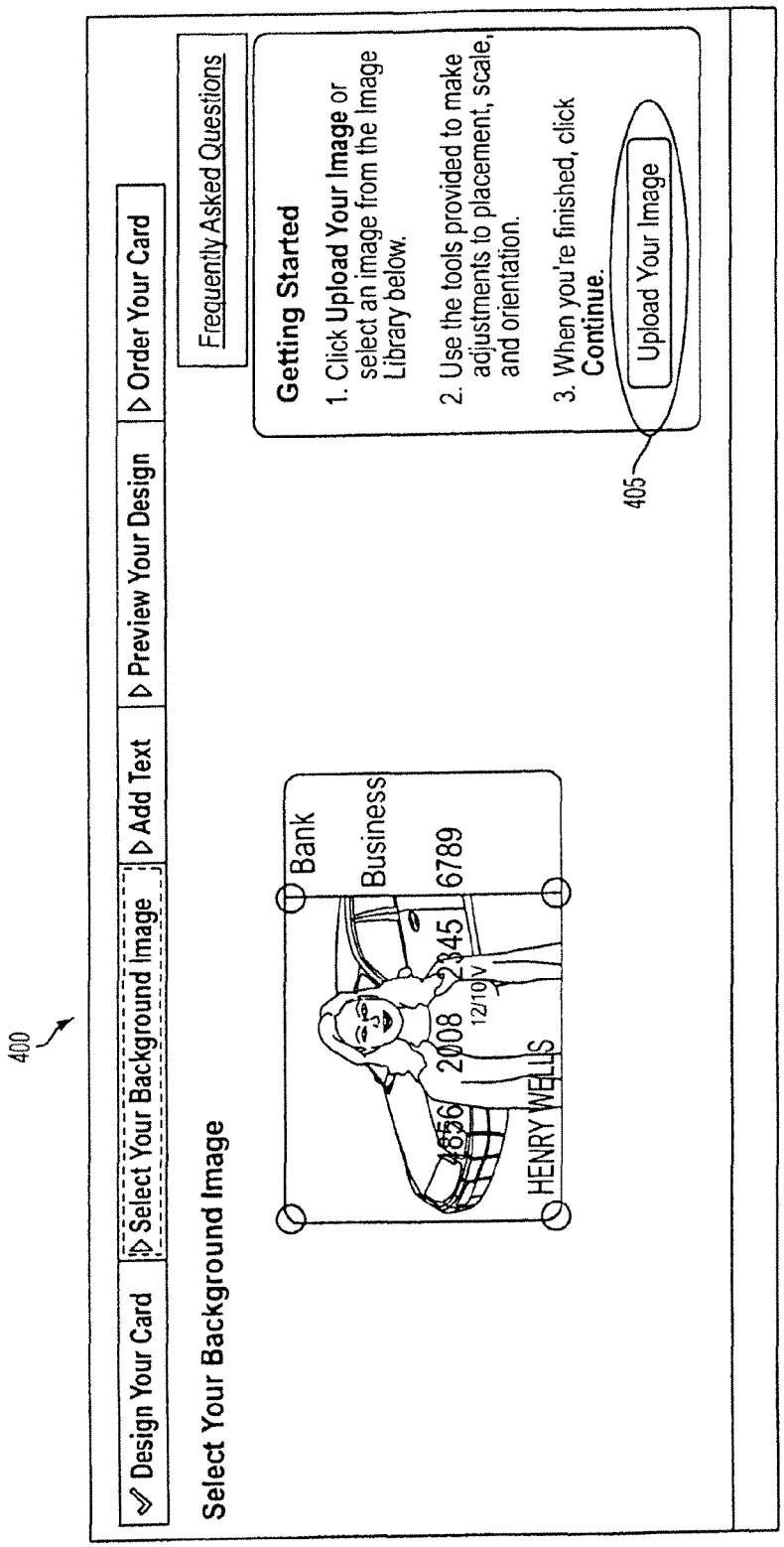
FIG. 4 is a screen shot showing a screen that may be provided to a user when the user has selected an option to design a background in the screen in FIG. 3.

Referring now to FIG. 4, FIG. 4 shows a screen 400 that may be provided to a user who selected the background customization in from FIG. 3 (i.e., option 310). The user may upload a custom image using button 405. As one example, the images may be clip-art type images. (In such a case, although the image is clip art uploaded from a standard library, it is nevertheless a "custom image" because it customizes the user's card as compared to more standard cards that are issued by the financial institution.) As another example, the images may be provided in connection with affinity programs conducted through partnerships with third-party entities. For example, sports teams or sports leagues may license team logos, game photos, player photos, and/or other images for use as custom images available through the image library. Upon payment of a license fee, users may then be provided with the ability to place such images on their cards.

Once the custom image is uploaded or selected, the user may be given the controls to modify placement, size rotation and flip the image. In other embodiments, the image editing and placement logic 145 adjusts the attributes of the custom image for placement on the customized card.

Figure 5:
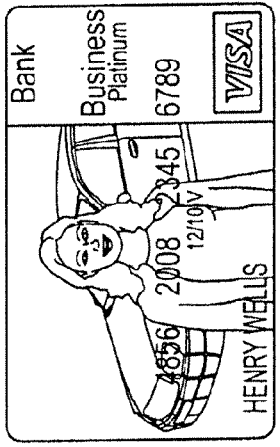
FIG. 5 is a screen shot showing a screen that may be provided to a user to add text when the user has selected an option to design a background in the screen in FIG. 3.
Figure 6:
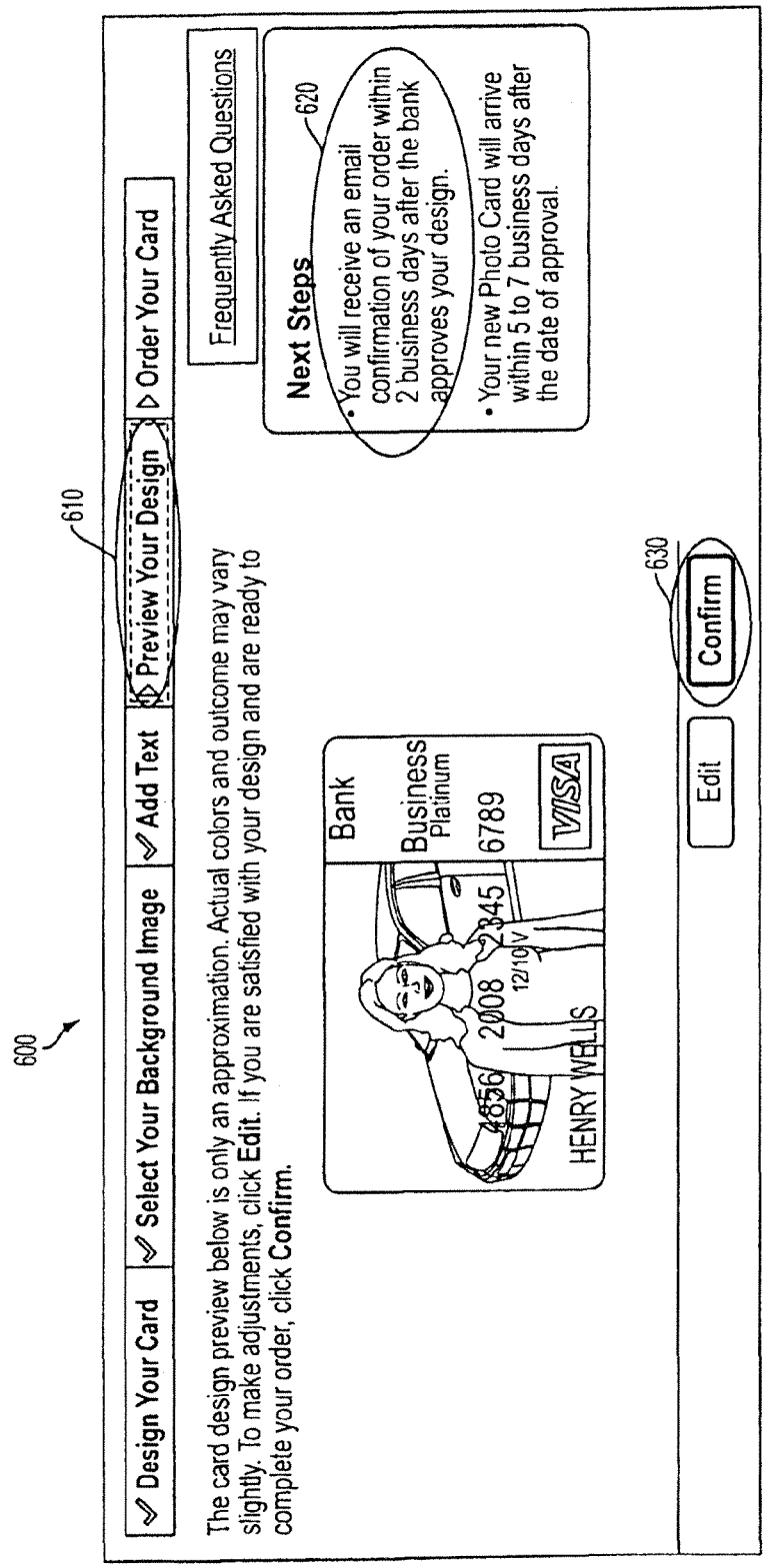
FIG. 6 is a screen shot showing a screen that provides a preview to a user when the user has selected an option to design a background in the screen in FIG. 3.

FIG. 5 shows a screen 500 that may be provided to a user after the background image is uploaded and adjusted in FIG. 4. The add text option 560 allows a user to configure the card to display lines of text. The text may be entered in fields 510. The formatting tools 550 allow the user to choose the font, color, size, style of the text. In one example embodiment the text may be a company tag line or company name. FIG. 5 shows two lines of text that may be added to the card, however, in other embodiments more than two lines of text may be allowed.

FIG. 6 is a screen shot showing a screen 600 that provides a view of the customized card after the image is uploaded in FIG. 4 and the text is added in FIG. 5. As shown in FIG. 6, the design is previewed (indicator 610) after adding text and before ordering the card. The screen display informs the user in field 620 that the user will received an e-mail confirming the order within a few business days after an approval of the design by the banking institution. In other embodiments the user can receive a text message confirming the order within two business days. In yet another embodiment the text message can be sent to a mobile device. By pressing confirm button 630, the user places an order for the customized card. As previously indicated, at no point during the process of FIGS. 2-6 is the user required to enter an account number for the customized card (or any part of an account number) or a social security number (or any part of a social security number). Thus, although the user may be required to provide such information in connection with setting up an account, or performing other account-related operations unrelated to card customization, the user is not required to provide such information in connection the process of receiving and processing the card customization order as described herein. Once the user obtains access to the on-line banking area of the website of the financial institution, the user is able to order one or more customized cards without having to enter further authentication information.

Figure 7:
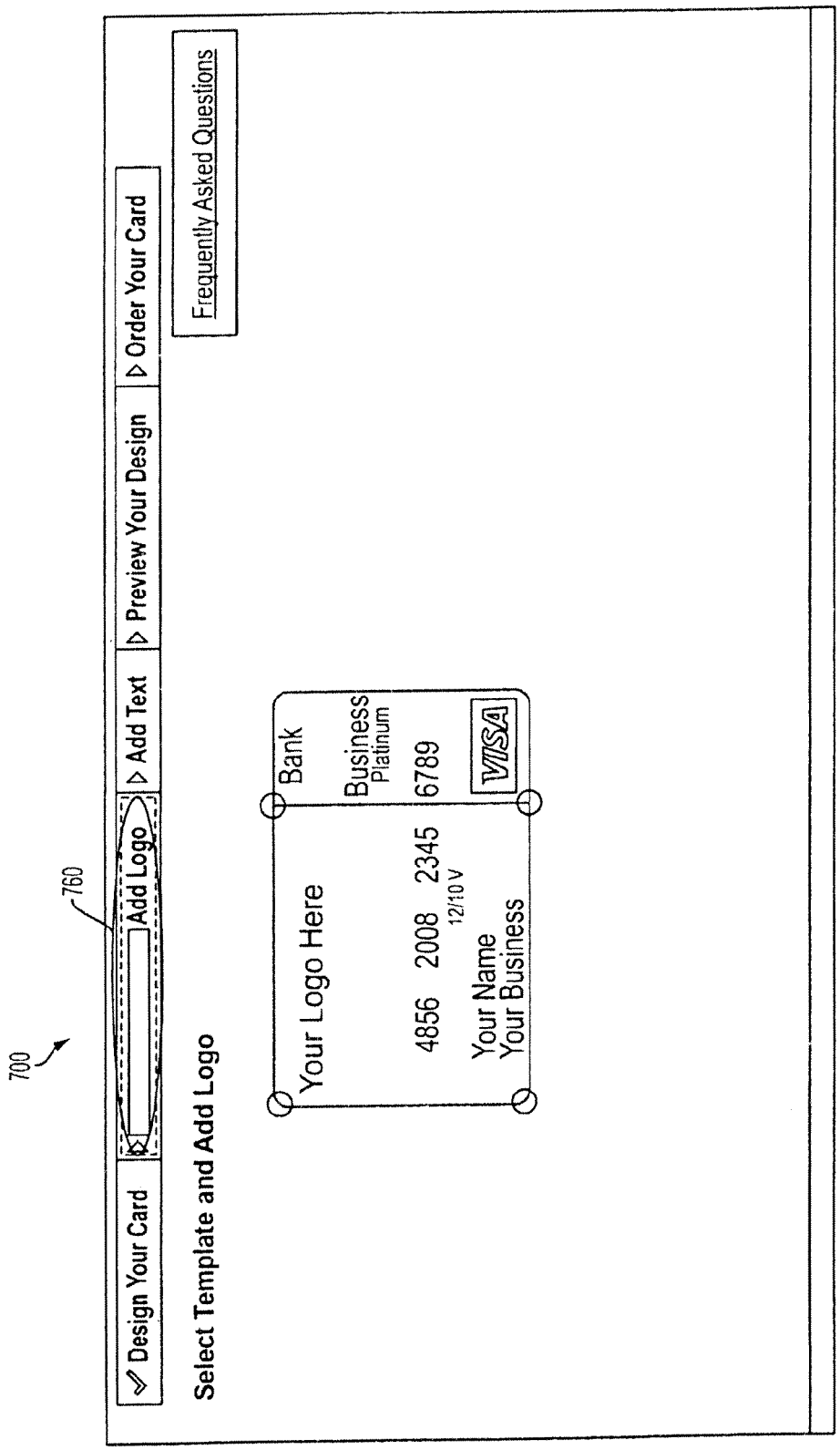
FIG. 7 is a screen shot showing a screen that may be provided to a user when the user has selected an option to select a template and logo in the screen in FIG. 3.

FIG. 7 is a screen shot showing a screen 700 that may be provided to a user when the user selected the option to add a logo in FIG. 3 (i.e., option 320). The user may upload the logo by using an upload logo button 705. Once the logo is uploaded (e.g., from a local storage device on the computing system 110), the user may be given the controls to modify placement, size, and rotation of the logo.

Figure 8:
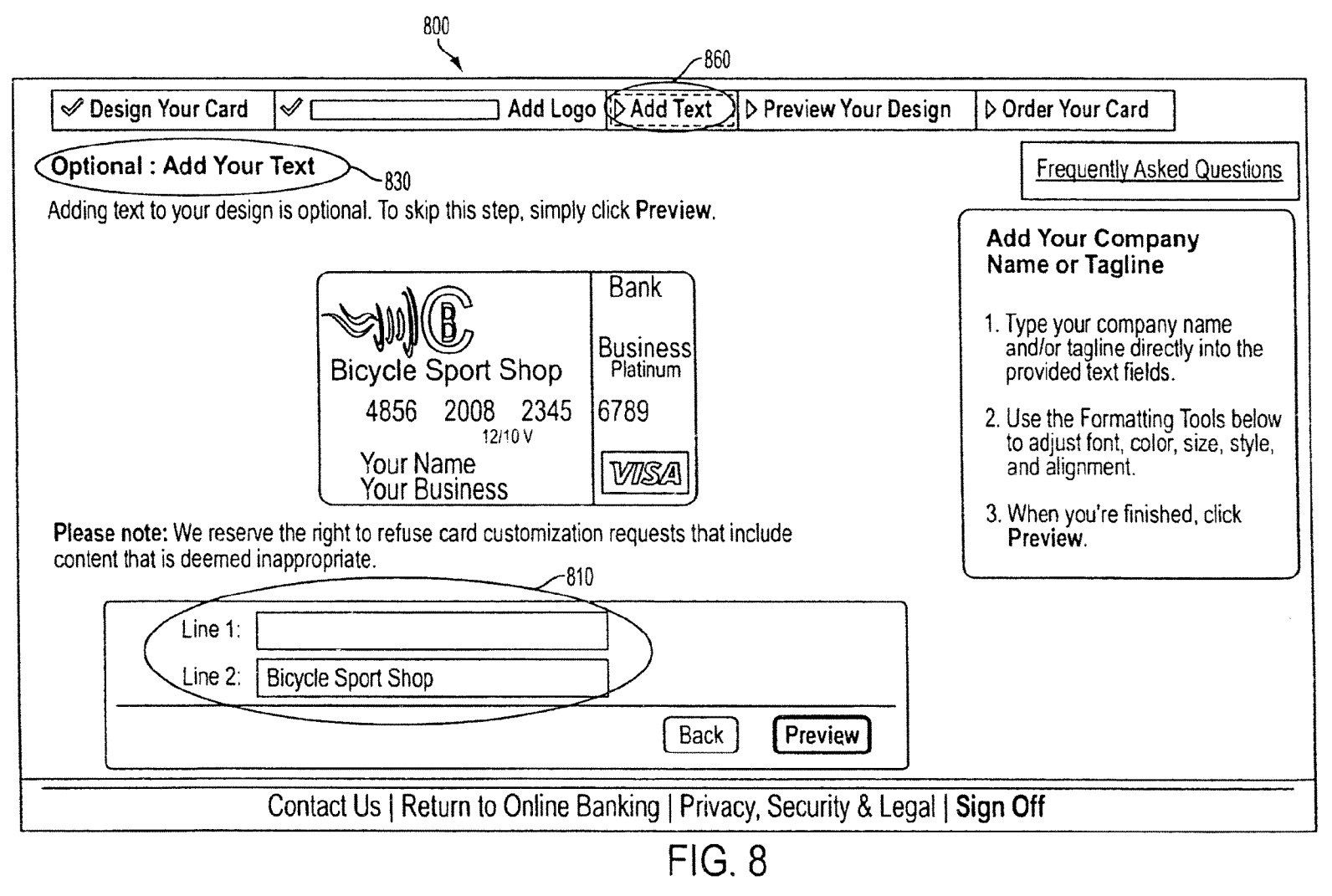

FIG. 8 shows a screen 800 that may be provided to a user after the logo is uploaded and adjusted in FIG. 7. Shown in FIG. 8 is a card with a logo to which lines of text may be added. The text may be entered in fields 810. The lines of text may be displayed on the card as shown in FIG. 8. Also shown in FIG. 8 are formatting tools 850 that allow a user to edit the font, color, size, style and alignment of the text. In FIG. 8, after entering the text, the user may press the preview button to view the text on the card prior to going to the next step.

Figure 9:
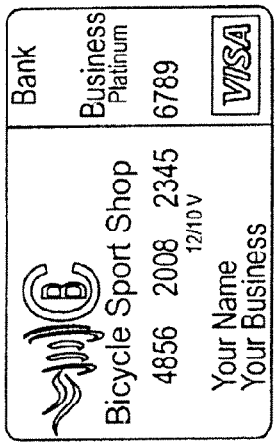
FIG. 9 is a screen shot showing a screen that may be provided to a user if the text that is added in FIG. 8 goes outside the designated margins of the card.
Figure 10:
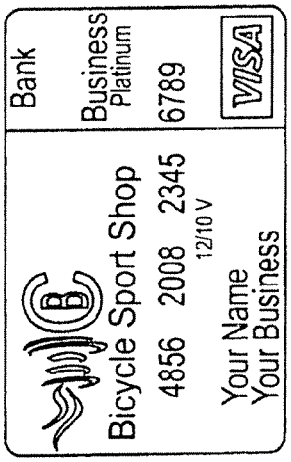
FIG. 10 is a screen shot showing a screen that provides a preview to a user when the user has selected an option to select a template and logo in the screen in FIG. 3.

FIG. 9 shows a screen 900 that may be provided to a user if the text that is added is outside the designated margins of the card. The screen output 910 warns the user that adjustment must be made to the text and allows the user to make the necessary changes. FIG. 10, which is similar to FIG. 6, is a screen shot showing a screen 1000 that provides a preview to a user after the image is uploaded in FIG. 7 and the text is added in FIG. 8.

Figure 11:
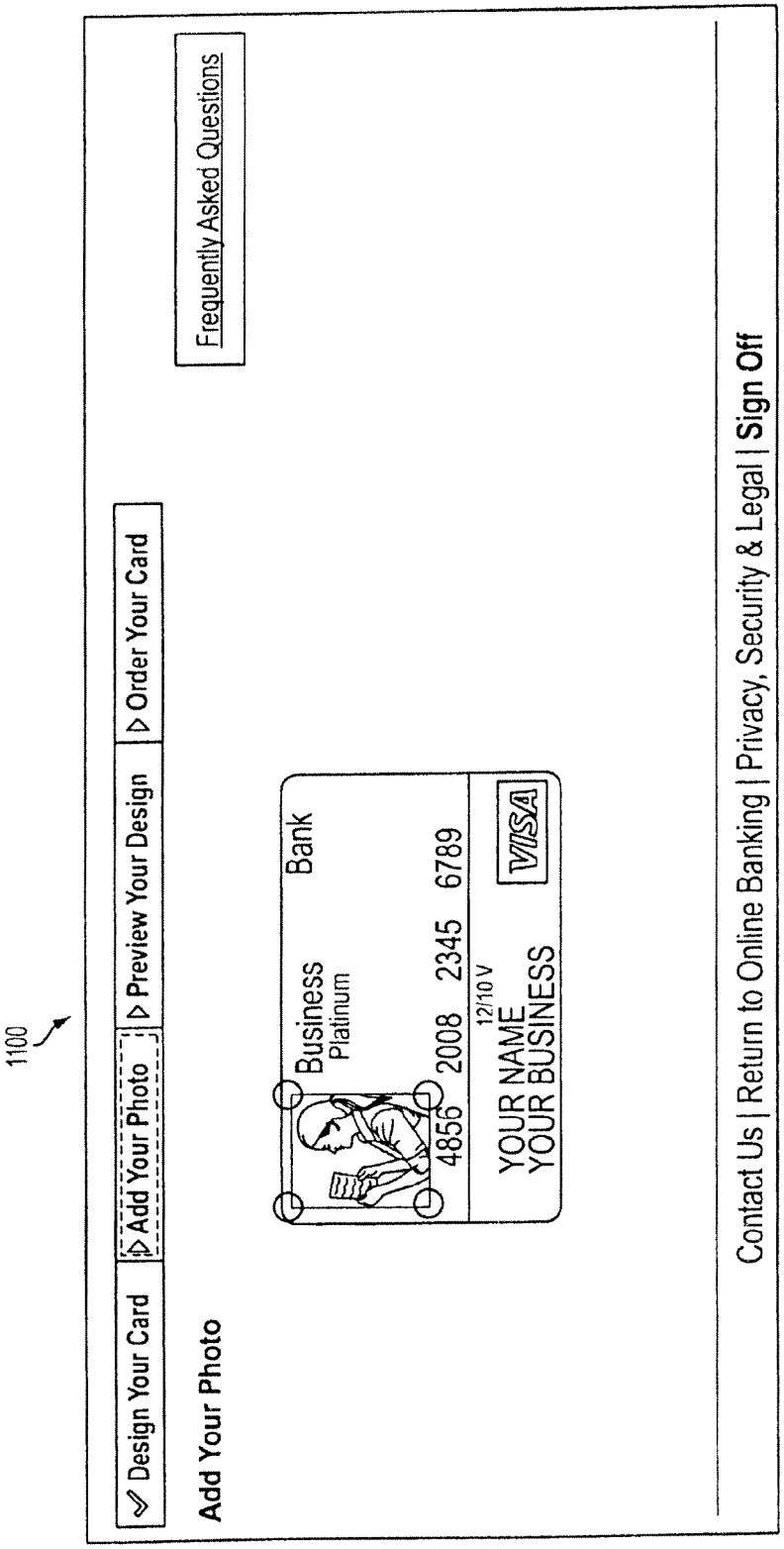
FIG. 11 is a screen shot showing a screen that may be provided to a user when the user has selected an option to add a photo in the screen in FIG. 3.
Figure 12:
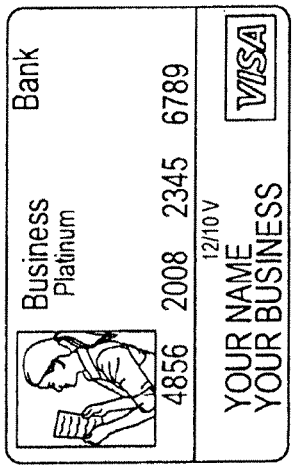
FIG. 12 is a screen shot showing a screen that provides a preview to a user when the user has selected an option to add a photo in the screen in FIG. 3.

Referring to FIG. 11, FIG. 11 is a screen shot showing a screen 1100 that may be provided to a user when the user selected the option to add a photo in FIG. 3 (i.e., option 330). The user may upload the photograph by using the upload photo button 1110. Once the picture is uploaded, the user is given the controls to modify placement, size, and rotation of the photo. Responsive to the user inputs received via various controls, the image editing and placement logic 145 adjusts the attributes of the custom image for placement on the customized card. FIG. 12, which is similar to FIG. 6, is a screen shot showing a screen 1200 that provides a preview to a user when the user has selected the photo option.

Referring again to FIG. 2, as shown in field 240, the user may also be given the option to remove the customization from a card that has already been customized. Referring now to FIG. 13A, FIG. 13A shows a screen 1300 that prompts the user to verify the removal of customization on a card. Screen 1300 is shown when the user choose the "remove" link for a given account shown in field 240 of FIG. 2. The user may choose "submit" button and in response the user is shown the screen shown in FIG. 13B. Choosing the remove option allows the user to remove the earlier customization of a card and allows the issuer to issue a new card that is without customization.

FIG. 13B is a screen shot informing the user that a request to remove customization for a card was received. The screen shot also shows a field 1330 which shows the updated status as "processing" for the card from FIG. 13A. A next step column 1340 is provided in which the user may choose to update a customized card and adjust each of the customization referred to in FIGS. 3-12.

In another embodiment, the screen shots and processes described in the above can be presented a various branch locations such as but not limited to a kiosk or an ATM machine. In this embodiment the user can order, remove or update card customization as part of an ATM transaction.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A computer-implemented method of customizing a card issued by a financial institution, comprising:
   generating a first screen display that is pre-populated with at least a portion of an issued card number, the issued card number being associated with the card and with an active account associated with a first user, and the account being eligible for card customization;
   receiving card customization information based on user input, the card customization information including information regarding a custom image to be placed on the customized card; and
   wherein the active account is further associated with a second user that has the ability to make purchases using the card;
   wherein the first user has access rights to the active account to configure customized cards for the second user; and
   wherein the eligibility for card customization is determined based on the temporal proximity to an expiration date of the card.

2. The method of claim 1, wherein receiving card customization information further comprises receiving an upload of the custom image and adjusting attributes of the custom image for placement on the customized card.

3. The method of claim 2, wherein generating the first screen display further comprises displaying the active account number that has been previously customized.

4. The method of claim 1, further comprising, prior to generating the first screen display:
   receiving user identification information and password information from the first user;
   authenticating the first user identification information and password information;
   permitting the first user to access an on-line banking area of a website of the financial institution responsive to the authenticating step, including permitting the first user to access account balance and transaction information for the active account associated with the first user; and
   providing the first user with a link to initiate an order for the customized card from within the on-line banking area of the website of the financial institution.

5. The method of claim 4,
   wherein the first user is not required to enter an account number for the customized card or any part thereof up until and including the time the order for the customized card is placed; and
   wherein the first user is not required to enter a social security number or any part thereof up until and including the time the order for the customized card is placed.

6. The method of claim 1, wherein the custom image comprises a photo to display on the customized card.

7. The method of claim 6, wherein the photo is obtained from a library of photos made available to the first user.

8. The method of claim 6, wherein the photo is uploaded by the first user from a storage device that is local to the first user.

9. The method of claim 1, wherein the custom image comprises a background design information for the customized card.

10. The method of claim 1, wherein the custom image comprises at least one line of text to display on the customized card.

11. The method of claim 1, wherein the custom image comprises a logo design for the customized card.

12. The method of claim 1, wherein the customized card is at least one of a credit card, a debit card, and a prepaid card.

13. The method of claim 1, further comprising manufacturing the customized card and sending the manufactured, customized card to the first user.

14. A computer-implemented data processing system comprising:
   a processor and program instructions stored in memory and configured to be executed by the processor, the processor and the program instructions in combination implementing program logic, the program logic further including:
   eligibility logic configured to generate a list of active accounts that are eligible for customized cards and that are associated with a first user and determine the eligibility for card customization based on the eligibility for card customization is determined based on the temporal proximity to an expiration date of the card;

network interface logic configured to generate a user interface for interaction with the first user, the first user interface including screen displays configured to display at least a portion of an issued card number associated with the card and with at least one active account and configured to receive card customization information from the first user, the card customization information including information regarding a custom image to be placed on a customized card; and wherein the active account is further associated with a second user that has the ability to make purchases using the card; and wherein the first user has access rights to the active account to configure customized cards for the second user.

15. The system of claim 14, wherein the customized card is at least one of a credit card, a debit card, and a prepaid card.

16. The system of claim 14, wherein the custom image comprises a photo to display on the customized card.

17. The system of claim 14, wherein the custom image comprises at least one line of text to display on the customized card.

18. The system of claim 14, wherein the custom image comprises a logo design for the customized card.

19. A computer-implemented method of receiving and processing a card customization order, comprising:

receiving user identification information and password information from a first user, the first user identification information and password information being received at a website of a financial institution;

authenticating the first user identification information and password information;

permitting the first user to access an on-line banking area of the website of the financial institution responsive to the authenticating step, including permitting the first user to access account balance and transaction information for active accounts held by the first user;

providing the first user with a link from within the on-line banking area of the website of the financial institution, the link being a link to initiate a customized card order; wherein the link to initiate a customized card order is connected to a webpage that is provided by a card customization entity that is a different entity than the financial institution;

transmitting to the card customization entity, the account information to permit the card customization entity to pre-populate the card customization order;

wherein, in connection the process of receiving and processing the card customization order, the first user is not required to enter an account number for the customized card or any part thereof up until and including the time the customized card is manufactured; and wherein, in connection the process of receiving and processing the card customization order, the first user is not required to enter a social security number or any part thereof up until and including the time the customized card is manufactured;

wherein the user is a first user;

wherein each of the active accounts is respectively associated with an additional user that has the ability to make purchases using the active accounts;

wherein the first user has access rights to the accounts for the additional user to configure customized cards for the additional users; and wherein the eligibility for card customization is determined based on the temporal proximity to an expiration date of the card.

20. The method of claim 19, wherein the customized card is at least one of a credit card, a debit card, and a prepaid card.

21. The method of claim 1, wherein the user was assigned the card number prior to the generating the first screen display.

22. The method of claim 1, wherein generating the first screen may include the user entering a user name and password to enter a financial institution website.

23. The method of claim 1, further comprising generating a display that includes pre-populated list of cards that are associated with the first user and are eligible for card customization.

24. The method of claim 23, wherein the pre-populated list includes an option to remove the card customization from a previously customized card.

25. The method of claim 1, wherein the first user is permitted to customize the card but is not given the access to make purchases using the card;

wherein the second user can make purchases using the but is unauthorized to customize the card.

* * * * *

UNITED STATES PATENT AND TRADEMARK OFFICE
CERTIFICATE OF CORRECTION

| | | |
|---|---|---|
| PATENT NO. | : 8,628,008 B1 | Page 1 of 1 |
| APPLICATION NO. | : 12/288110 | |
| DATED | : January 14, 2014 | |
| INVENTOR(S) | : Jesse Fung Lee et al. | |

It is certified that error appears in the above-identified patent and that said Letters Patent is hereby corrected as shown below:

In the Claims

Column 12, Claim 25 should read

25. The method of claim 1, wherein the first user is permitted to customize the card but is not given the access to make purchases using the card;

wherein the second user can make purchases using the -- card -- but is unauthorized to customize the card.

Signed and Sealed this
Thirteenth Day of May, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO. : 8,628,008 B1
APPLICATION NO. : 12/288110
DATED : January 14, 2014
INVENTOR(S) : Jesse Fung Lee et al.

It is certified that error appears in the above-identified patent and that said Letters Patent is hereby corrected as shown below:

In the Claims

Column 12, Claim 25, line 39-43, should read

25. The method of claim 1, wherein the first user is permitted to customize the card but is not given the access to make purchases using the card;

wherein the second user can make purchases using the -- card -- but is unauthorized to customize the card.

This certificate supersedes the Certificate of Correction issued May 13, 2014.

Signed and Sealed this
Tenth Day of June, 2014

Michelle K. Lee
*Deputy Director of the United States Patent and Trademark Office*